July 17, 1956 G. PAPITTO 2,755,424

AUTOMATIC AND TIME CONTROLLED CHANNEL SELECTORS FOR TELEVISION OR RADIO RECEIVERS

Filed July 28, 1954 6 Sheets-Sheet 1

INVENTOR.

Gene Papitto

BY

Robert H. Wendt

Atty.

July 17, 1956 G. PAPITTO 2,755,424
AUTOMATIC AND TIME CONTROLLED CHANNEL SELECTORS
FOR TELEVISION OR RADIO RECEIVERS
Filed July 28, 1954 6 Sheets-Sheet 2

INVENTOR.
Gene Papitto
BY
Robert H. Wendt.
Atty.

INVENTOR.
Gene Papitto
BY
Robert W. Wendt
Atty.

INVENTOR.
Gene Papitto
BY
Robert H. Wendt
Atty.

INVENTOR.
Gene Papitto
BY
Robert H. Wendt
Atty.

July 17, 1956 G. PAPITTO 2,755,424

AUTOMATIC AND TIME CONTROLLED CHANNEL SELECTORS FOR TELEVISION OR RADIO RECEIVERS

Filed July 28, 1954 6 Sheets-Sheet 6

INVENTOR.
Gene Papitto
BY
Robert H. Wendt
Atty.

United States Patent Office 2,755,424

Patented July 17, 1956

2,755,424

AUTOMATIC AND TIME CONTROLLED CHANNEL SELECTORS FOR TELEVISION OR RADIO RECEIVERS

Gene Papitto, Chicago Heights, Ill.

Application July 28, 1954, Serial No. 446,211

19 Claims. (Cl. 318—443)

The present invention relates to automatic and time controlled channel selectors for television or radio receivers or the like, and is particularly concerned with such devices for controlling the receiver so that any predetermined channel may be tuned in at any desired time of the day by merely properly setting the automatic selector.

The present application is a continuation in part of my prior application, Serial No. 389,120, filed October 29, 1953, on Remote Control Channel Selector for Television Receivers and the like.

One of the objects of the invention is the provision of an improved channel selector for television receivers in which the user my preselect the programs for an entire twenty-four hours, and in which the device is adapted to tune the receiver for any preselected channel at the beginning of any fifteen minute period throughout the day and night.

Another object of the invention is the provision of a channel selector of the class described which will entirely deenergize the television receiver at certain times, if so adjusted, and at other times which have been predetermined it will not only energize the television receiver but will select the channel desired at the time desired.

Another object of the invention is the provision of an improved channel selector which is simple in construction, which is positive in its action, which is accurate in its tuning, which may be economically manufactured, which has a minimum number of parts, and which may be used for a long period of time without necessity for repair or replacement of any of its parts.

Another object of the invention is the provision of an improved channel selector which is adapted to utilize the tuning mechanism of my prior application by merely eliminating the remote control switches in the form of push buttons that are employed in that device and substituting a clock controlled step by step switching mechanism.

Other objects and advantages of the invention will be apparent from the following description and the accompanying drawings, in which similar characters of reference indicate similar parts throughout the several views.

Referring to the drawings, of which there are six sheets, accompanying the specification, Fig. 1 is a view in perspective of an automatic channel selector assembly embodying the invention;

Figure 1:
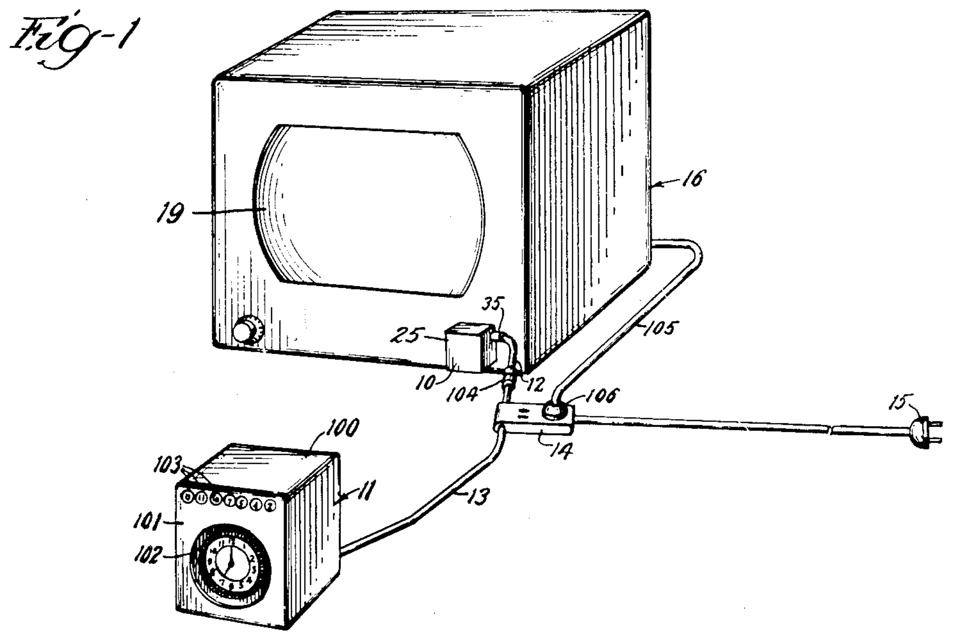

Referring to Fig. 1, the present apparatus preferably includes a motor driven switching unit 10, an automatic time controlled selector unit 11, connecting cables 12 and 13, a female connector 14, and a male connector 15 for insertion into a wall socket.

A suitable television receiver is indicated at 16, and it may be located upon a table or other suitable support which preferably also has provisions for supporting the time controlled selector unit 11, which may be placed on top the television receiver, if desired.

The receiver screen is indicated at 19. The receiver is provided with the usual channel selector shaft 20, the knob of which has been removed and the end of which has been inserted in a tubular coupling 21, having a pair of set screws 22, 23, for providing a driving connection between the channel selector shaft 20 and the driven shaft 24 of the motor driven switching unit 10.

The television receiver 16 has its channel selector shaft provided with the usual indexer (not shown) for holding the channel selector shaft in proper position for any selected channel.

The motor of the motor driven switching unit 10 has sufficient power to overcome the resistance of the channel selector shaft indexer of the receiver.

Both the motor driven switching unit 10 and the time controlled channel selector 11 may be housed in suitable rectangular housings made of wood, plastic or metal, matching the furniture or housing of the television receiver.

The housing for the motor driven switching unit 10 is indicated at 25 in dotted lines, and this housing is mounted on the television receiver by means of a sheet metal angle bracket 26, having a horizontal flange 27, which is secured to the bottom of the receiver, and a vertical flange 28 which is secured to the unit frame 29 by a plurality of screw bolts 30, passing through slots so that the vertical elevation of the unit relative to the bracket may be adjusted to fit the elevation of the channel shaft 20.

Figure 3:
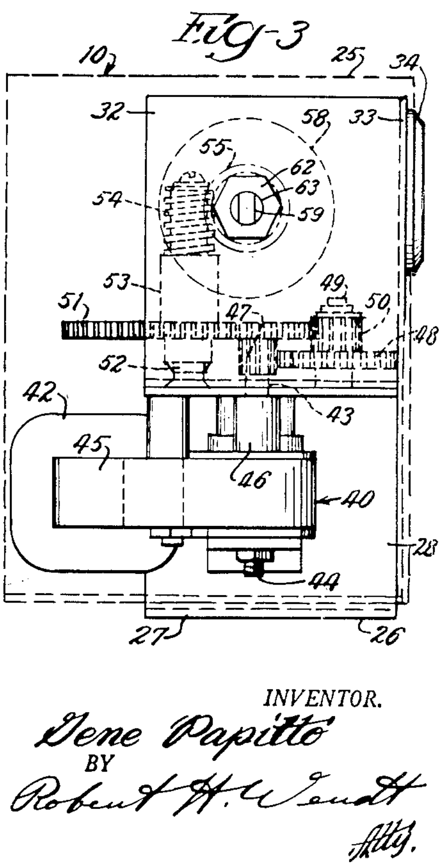
Fig. 3 is an end elevational view.

The motor driven switching unit 10 preferably includes a sheet metal frame 29, having a pair of vertical flanges 31, 32, joined by a third vertical flange 33, Fig. 3.

Vertical flange 33 is used to support a multiple prong connector socket 34, having an aperture and contacts for each of the prongs of a multiple prong connector 35, Fig. 1, connected to the cable 12 and to the conductors therein.

The other vertical flanges 31, 32 are provided with horizontally extending attaching flanges 37 and 38 for mounting a base plate 39 of an electric motor 40 by means of a plurality of screw bolts 41.

The electric motor may be of any standard type adapted to be driven by 110 volt, 60 cycle alternating current, and its winding is indicated at 42, while its drive shaft is indicated at 43.

The motor is secured to the base plate 39 by a plurality of screw bolts 44, passing through the field core 45 and provided with tubular spacers 46.

The motor shaft carries a pinion 47 at its upper end meshing with a fiber spur gear 48, rotatably mounted upon a shaft 49 and attached to a second pinion 50.

The pinion 50 drives a larger spur gear 51, mounted upon a shaft 52 and fixedly secured by means of an elongated hub 53 to a worm 54.

Figure 2:
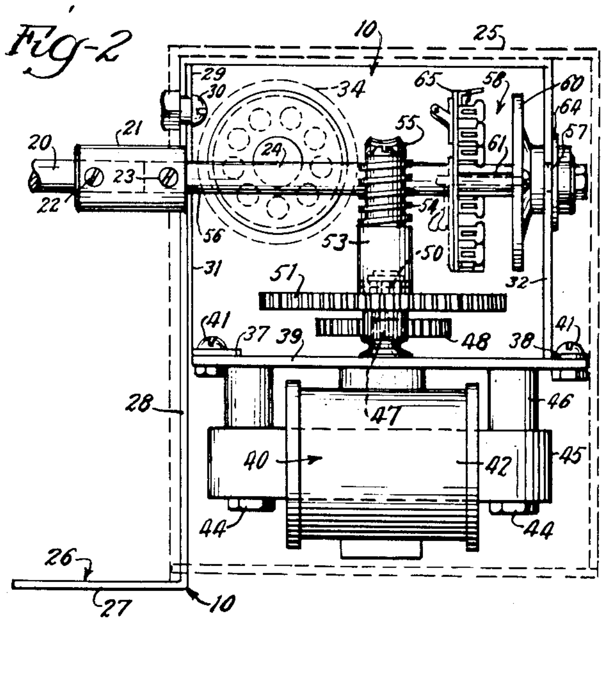
Fig. 2 is a side elevational view of the driving mechanism for the channel selector dial of the television receiver with the housing shown in dotted lines.

The worm 54 meshes with the worm gear 55, Fig. 2, which is mounted upon the driven shaft 24, driving the driven shaft 24 at a suitable reduced speed from the motor shaft 43.

The speed reducing gearing and the motor shaft 43 includes the worm gear and worm which is a one-way mechanism adapted to hold the channel selector shaft to any position to which it is moved.

The two vertical flanges 31 and 32 of the motor switching unit frame 29 are provided with aligned apertures 56 and 57, the first of which is to pass the shaft 24 and serve as a bearing, and the second of which is to provide a support for a rotary switch unit 58.

Figures 4, 5:
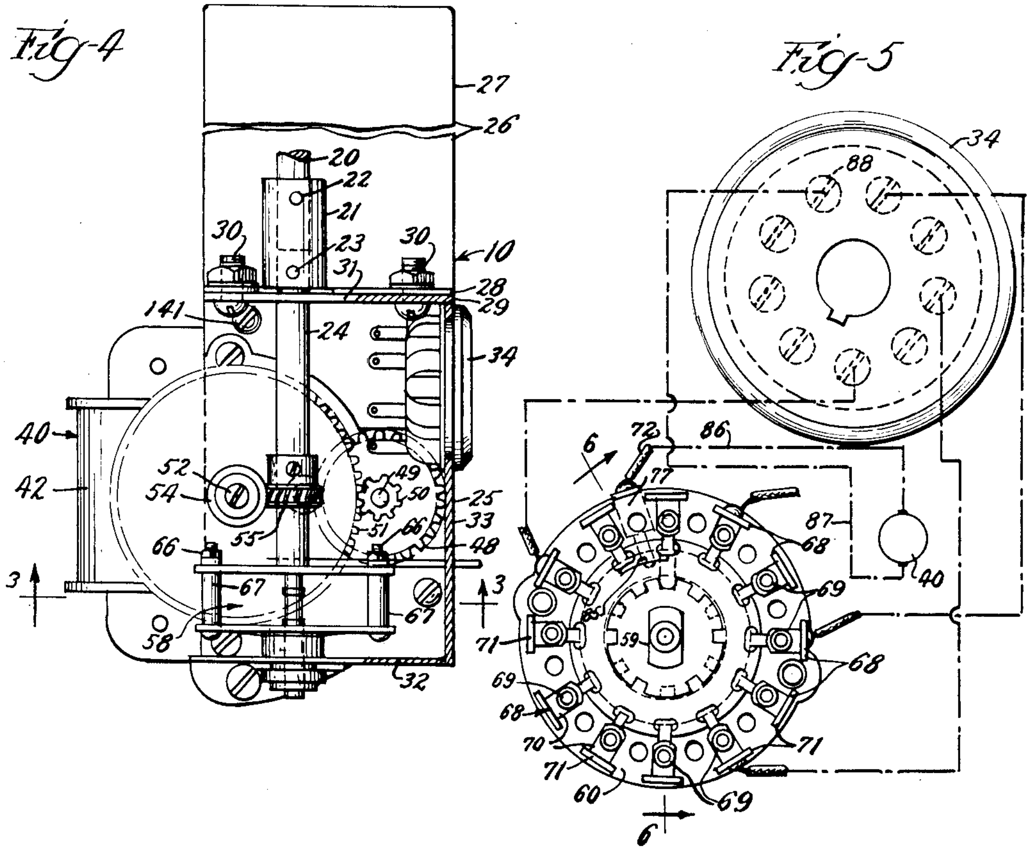
Fig. 4 is a top plan view.
Fig. 5 is a fragmentary elevational view showing the fixed and movable contacts of the motor driven switch unit in the device of Figs. 2 to 4 and the corresponding connecting conductors.
Figure 6:
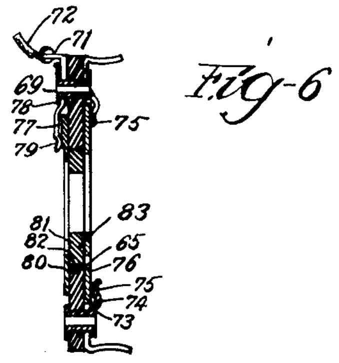
Fig. 6 is a fragmentary sectional view taken on the plane of the line 6—6 of Fig. 5, looking in the direction of the arrows.

Shaft 24 carries the worm gear 55 and passes through the rotary switch unit 58, and has a flattened end portion 59, Fig. 5, by means of which it drives the rotary switch 58.

The rotary switch unit 58 comprises a supporting plate 60 which is secured centrally to the hub 61 that passes through aperture 57, and is secured in place by a nut 62 on its threaded end 63. A lock washer 64 is used with nut 62.

The hub 61 is hollow having a bore acting as a bearing for the flattened end portion 59 of the shaft 24, the round portions of which act as a trunnion.

The supporting plate 60 of the rotary switch 58 carries an insulating plate 65, by means of a plurality of screw bolts and nuts 66 and tubular spacers 67.

The insulating disc 65 carries a multiplicity of fixed contacts 68, arranged in a circle and secured to the disc by rivets 69. Each contact 68 has an attaching flange 70 for the rivet and a connector flange 71 extending at right angles and having an aperture for reception of a conductor 72 which is soldered to it.

Each contact 68 has an offset at 73 and a parallel portion 74 which is spaced from the disc 65, and ends in a curved contact portion 75. The portion 74 gives the contact resiliency and holds it in engagement with an annular movable contact 76.

One of the rivets also supports a common contact 77, having a curved resilient portion 78 and a contact nib 79 for engaging a common angular contact plate 80 located on the other side of the insulating disc 65.

The two annular contact plates 76 and 80 are riveted at multiple points to a rotating insulating annulus 81, which is located in the bore 82 in the disc 65. The two plates 76 and 80, with the insulating annulus 81, form a groove 83 for engaging inside the bore 82 of the insulating disc 65, so that the plates 76 and 80 rotate together on the insulating disc 65.

The two plates are electrically connected by transverse riveting formations that hold them together and are always in contact in electrical conducting relation to the common contact 77.

The annular contact 76 engages all of the fixed contacts 68 but one, which one corresponds to the channel selected, and the annular contact plate 76 misses this one contact member because it has a cutout portion 85, Fig. 5, which is dipped enough radially to miss all of the contacts 68, and which is wide enough peripherally so that one of the contacts 68 is not engaged by the plate 76; but the contacts 68 on both sides of the slot 65 engage the plate 76.

The motor driven switching unit is shown as having a multiplicity of contacts, although at the present time only seven are contemplated to be used for seven different channels.

The common contact 77 is connected by one conductor 86 to one of the terminals of the motor 40. The other terminal is connected by conductor 87 to one of the contacts 88 of the multiple contact socket.

Figure 14:
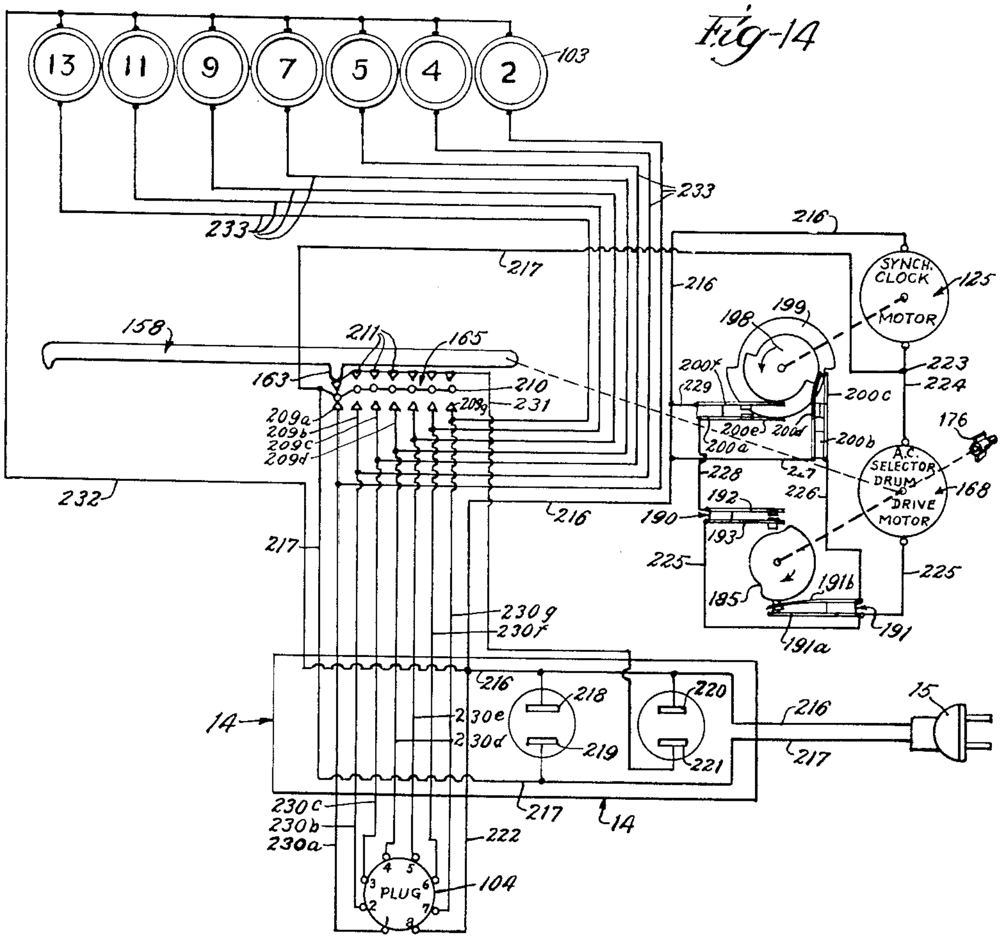
Fig. 14 is a wiring diagram.
Figure 14:
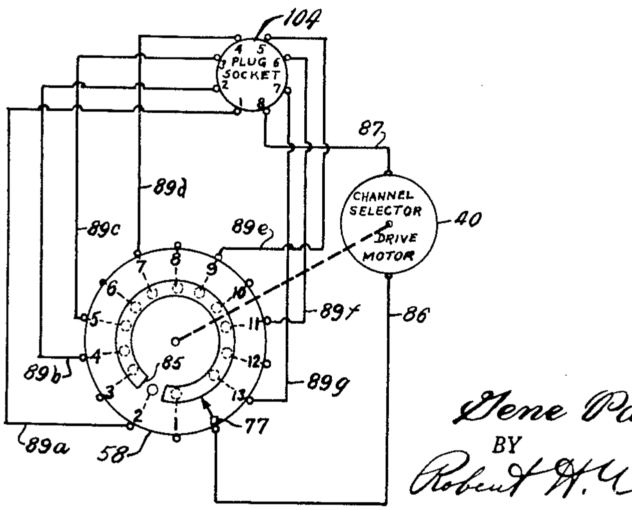

All of the other fixed contacts 68 which are being utilized are connected by suitable conductors 89*a*, 89*b*, 89*c*, 89*d*, 89*e*, 89*f*, and 89*g*, Fig. 14, to the contacts which are numbered 1 to 7 of the socket 34.

Thus the motor is adapted to be energized through the multiple contact socket 34 and plug 35 and cable 12, which contains all of the conductors 87 and 89*a* to 89*g*, inclusive, and any number of additional contacts and conductors may be employed for additional channels.

The present television channel tuning device 10 may be substantially the same as that described in my prior application, Serial No. 389,120, of which this is a continuation, and the disclosure of said application is hereby incorporated by reference thereto.

The automatic channel selector 11 is employed in the present invention instead of the push button channel selector of my prior application; and the automatic selector may be substantially as follows:

The channel selector 11 may be enclosed in any suitable type housing 100, having a face 101, provided with a round aperture 102 for exposing the clock dial and selector members, further to be described.

The face 101 may also support a multiplicity of signal lights 103, which may be at the top or bottom of the face of the unit, and these signal lights have appropriate channel indicia on them as they indicate the channel which is in circuit at any time.

As shown in Fig. 1, the automatic station selector is connected by cable 13 to the cable 12, by means of a multiprong connector and socket 104, and it is also connected to the female socket member 14, which is energized from the 110 volt line by the prong connector 15.

The television energizing cord 105 having two conductors to be connected to the 110 volt, 60 cycle line is plugged into the socket 14 by means of a two-prong connector 106. Under these conditions the unit 11 not only controls the channel selection, but also turns the television receiver on or off as required by the adjustment of the unit 11.

The mechanism of the automatic channel selector may be supported upon a metal bracket 107, provided with a horizontal foot flange 108, which is secured to the bottom 109 of the housing 100 by a plurality of screw bolts 100.

The bracket 107 has an upwardly extending portion 111 and a right angle bend at 112, providing a horizontal portion 113 which extends forwardly to support the mechanism. At its front end this horizontal portion 113 has an attaching flange 114, provided with a plurality of screw bolts 115 for supporting a vertical bracket 116.

The vertical bracket 116 comprises a steel disc with a central forwardly offset portion 117, having an aperture 118 for receiving a hub 119, which carries the metal dial plate 120 on its end by means of a plurality of screw bolts 121.

Hub 119 has the vertical bracket 116 secured to it by means of a nut 122 on the threaded end 123 of the hub. The hub 119 has a through bore 124 for passing the multiple shafts of the clock unit 125.

Clock unit 125 has a central second hand shaft 126 bearing second hand 127. The clock unit has a minute hand shaft 128 surrounding the second hand shaft and provided with a minute hand 129.

The outermost clock shaft is the tubular hour shaft 130 which carries the hour hand 131. The clock unit 125 comprises a synchronous 60 cycle clock motor which is provided with any suitable form of reducing gears mounted between the plates 132 and 133, which are spaced by spacers 134 and secured together by screw bolts 135.

Plate 133 is secured to the front of the clock unit 125, and one of the clock gears 136 engages a pinion 137, mounted on an elongated shaft 138, having a knurled head 139 and used for setting the clock. The clock motor 125 may be of the self-starting type.

The hub 119 also serves as a trunnion, having an external cylindrical surface 140 for rotatably supporting a station selector disc 141.

Station selector disc 141 comprises a circular member of insulating plastic which has spokes 142 leading from a circular rim 143 to the hub 144, which is rotatably mounted on trunnion 119.

Trunnion 19 has a radially extending flange 145 in front of the hub 144 and the plate 116 engages an annular shoulder 146 on the other side of the hub 144.

The dial plate and hands are preferably enclosed by a transparent molded plastic crystal member 147, which has a cylindrical border flange 148 and an attaching flange 149 secured to the rim 143 by a plurality of screw bolts 150.

Channel selector disc 141 has a radially extending flange portion 151, which is provided with a multiplicity of radially extending slots 152. The slots 152 are preferably arranged in a circle, equally spaced from each other, and there are four slots for each hour of twenty-four hours, making a total of ninety-six slots arranged in a circle with every fourth slot located on the hour, and a slot for each fifteen minutes.

In some embodiments of the invention the slots may be arranged in more than one circle with the switches also appropriately arranged.

The clock 125 is geared to drive cams 198, 199 once every hour, and as the switches are 90 degrees apart, the current is made and broken by the clock 125 once every fifteen minutes.

The station selector unit 11 is also provided with a second plastic disc 153, spaced from the first disc 141 by means of tubular spacers 154 and secured by through bolts 155, forming a rotating cage.

The second plastic disc 153 has slots 156 which are in alignment with the slots 152 and equal in number, spacing and location. Disc 153 has its central portion cut away, leaving only an annular member in order to provide the inside edge 157 of this member with suitable formations for effecting a step by step movement of the cage.

The slots 152 and 156 slidably support a multiplicity of manual preselector members 158. These preselector members may comprise straight metal strips provided with an inner, smooth edge 159, and with a scalloped upper edge 160, having a multiplicity of partially circular grooves 161 to serve as an indicator for receiving an endless helical coil spring 162.

As the preselector members 158 extend in a full circle about the device, the endless coil spring 162 may be initially tensioned to be pulled into the grooves 161; and this spring 162 tends to stand still insofar as front to back movement is concerned because it is held by the other grooves 89, when any one preselector 158 is slid back and forth.

In addition to the grooves the preselectors 158 have a depending or inwardly extending lug 163, provided with a rounded camming end 164 for actuating a plurality of switches in a switch unit 165.

The preselectors 158 preferably have a laterally or outwardly turned lug 166, exposed at the face end of the device, and the preselectors may be alternately arranged with half of the lugs 167 turned inwardly to be more conveniently grasped with the fingers.

The number of grooves 161 on each preselector 158 may be equal to the number of channels plus one, the extra position being for turning off all switches when no channel is to be selected.

The preselector cage comprising discs 151 and 153 is moved with a step by step movement, stopping at each fifteen-minute position, and this may be accomplished by means of a driving motor 168, having its drive shaft 169 provided with a screw 170 for driving a worm gear 171 on a shaft 172.

Figure 10:
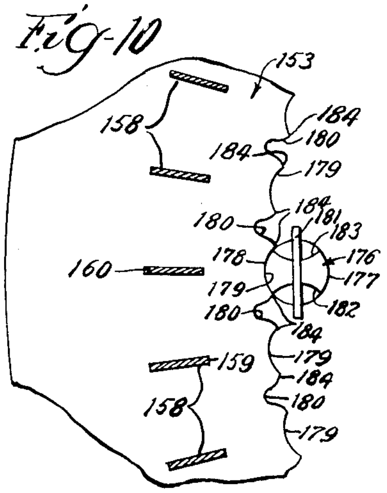
Fig. 10 is a fragmentary sectional view taken on the plane of the line 10—10 of Fig. 7, showing the step by step mechanism.
Figure 11:
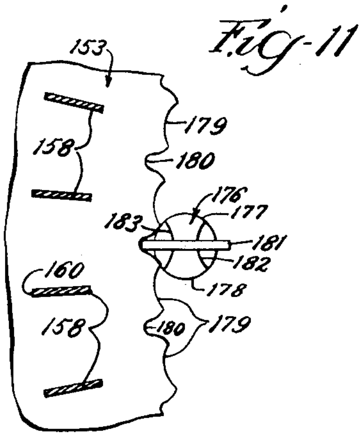
Fig. 11 is a similar view of the mechanism of Fig. 10 in a different position.

The motor 168 may be supported on the bracket 107 by means of a straight bracket 173, and a plurality of screw bolts 174, 175. Worm gear 171 drives shaft 172 when the motor is energized, and shaft 172 has its end provided with a Geneva driving gear 176, Fig. 10.

This Geneva driving gear comprises a member having a pair of cylindrical surfaces 177, 178, diametrically opposite to each other and adapted to rotate in a cylindrical groove 179 in the annular member 153.

The annular member 153 has tooth grooves 180 between each pair of cylindrical grooves 179, the tooth grooves 180 and cylindrical grooves 179 alternating in location.

The Geneva gear 176 has a fixed tooth bar 181 projecting from its sides and located 90 degrees from the centers of the cylindrical portions 177, 178.

The Geneva gear 176 has a partially cylindrical cavity 182, 183, surrounding the tooth bar 181, where it projects from the gear at each side to provide a suitable clearance for the outwardly projecting nibs 184 on the Geneva gear member 153.

The operation of this Geneva pinion and gear is as follows:

When the shaft 172 rotates a part of its rotation is ineffective to cause motion because the cylindrical part 177 or 178 rotates freely in the cylindrical grooves 179. This portion of the Geneva gear and pinion enables the shaft 172 to hold the member 153 in fixed position at each quarter of an hour position.

As the shaft 172 rotates the tooth bar 181 dips into one of the tooth grooves 180 and moves the member 153 and the member 141 forward one step.

Figure 7:
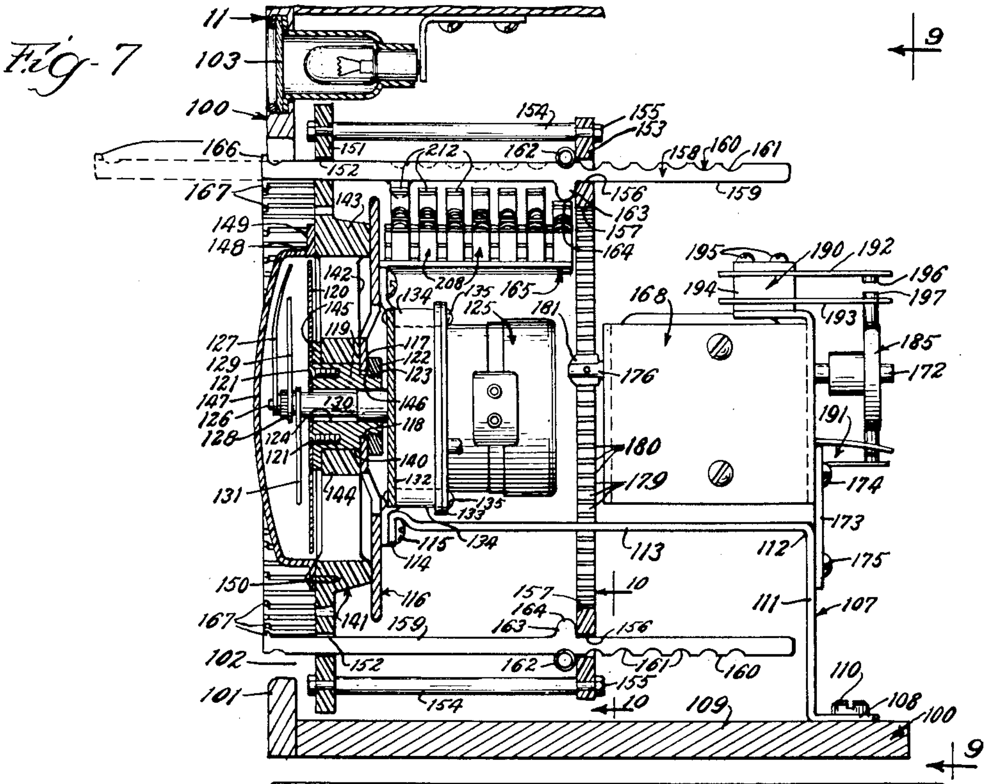
Fig. 7 is a fragmentary, vertical sectional view taken through the automatic time controlled switching device on the plane of the line 7—7 of Fig. 9.

The motor 168 is then cut off and this is accomplished by means of a cam 185 mounted on the other end of shaft 172, Fig. 7. Cam 185 has a portion 186 of reduced radius and a pair of rises 187, 188, Fig. 9, leading to a dwell 189 of increased radius.

The housing of motor 168 supports two switch units 190 and 191, and when one of these switch units is closed by being engaged by the dwell 189, the other switch unit 190 is on open circuit because of the reduced radius at the portion 186 of the cam.

Switches 190 and 191 may be similar in construction, each comprising a pair of switch blades 192, 193, held by clamping between a plurality of insulating blocks 194, by screw bolts 195, which secure the switch unit to the housing.

The blades 192, 193 have contacts 196 and 197 which are biased to open position and are closed only when the cam dwell 189 engages the inner blade at its depending finger.

Switch units 190, 191 are so arranged in the circuit, Fig. 14, that they are alternately used to energize the motor 168 and to cut off the motor 168 when one step has been taken, and the round portion 177 or 178 of the Geneva pinion has reached the next cylindrical groove 179 of the Geneva gear 153.

Thus the motor 168 drives the channel selector 141, 153, step by step, once each quarter hour, and standing still at the end of one quarter hour and the beginning of the next until the end of the current quarter hour.

The clock motor 125 does not drive the channel selector 141 but does control its driving by means of the shaft 138 which carries a pair of cams 198, 199 for controlling switch unit 200*a* and 200*b*.

Figure 9:
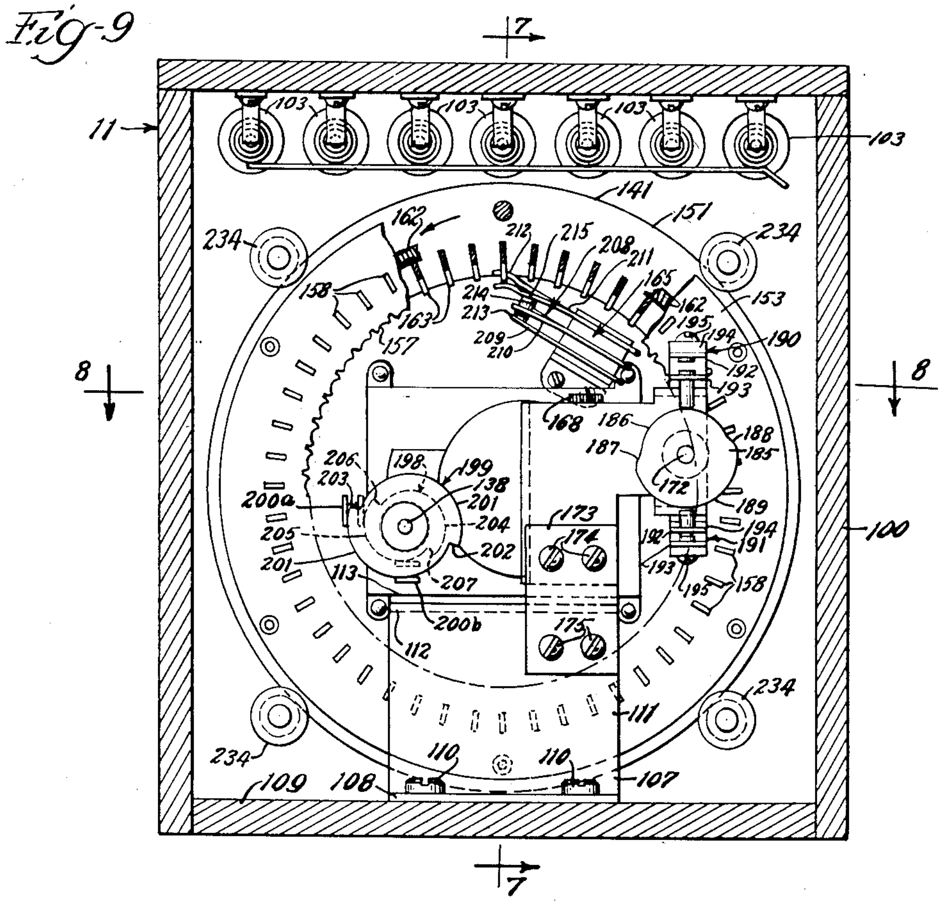
Fig. 9 is a fragmentary front elevational view taken on the plane of the line 9—9 of Fig. 7.

Cam 199, Fig. 9, has a pair of dwells 201 and 201 of increasing radius extending from a minimum radius at each rise 202 to a maximum at the next rise 203.

Cam 198, Fig. 9, is of the same construction having a pair of dwells 204, 205 of increasing radius between the abrupt drops 206, 207.

The cams 198 and 199, and switches 200*a* and 200*b*, control circuits for initiating the movement of the motor 168, these circuits and switches being so connected with the switch units 190 and 191 that the latter switch units are adapted to cut off the motor alternately.

For conrolling the tuning of the various channels the channel selector is provided with the switch unit 165, which preferably includes as many contact assemblies 208 as there are channels to be selected.

These contact assemblies can be seen in Fig. 9 in side elevation. Each contact assembly preferably includes three separate contact blades 209, 210, and 211; and the contact 211 is provided with a curved extension 212 to be engaged by the camming lug 163.

The rotation of the cage and preselector members 158 is counterclockwise in Fig. 9, and thus the lugs 163 pass to the left over the camming extension 212; and whenever there is a lug located to engage one of the switch units 165 the contacts 213, 214 and 215 are all closed, but these contacts are normally biased to the open position.

The lugs 163 are rounded at their ends so that they are adapted to actuate the extension 212 by being moved forward or backward so that selection may be at any time by using the preselectors 158.

Referring to Fig. 14, this is a wiring diagram of the automatic station selector. The main parts of the mechanism shown in this diagram bear the same indicating numbers.

The 110 volt line beginning at the connector plug 15 is indicated by the numbers 216 and 217. These conductors extend to the contacts 218, 219 of the female plug 14, and to one of the contacts 221 of the other socket on the same plug.

The line 216 is extended by conductor 222 to the contact 8 of plug 35, which will connect with contact 8 of plug 34, extending to one side 87 of the channel selector drive motor 40.

Conductor 217 also extends upward and is connected to a center series of contacts represented by blade 210 in the switch unit 165. Conductor 217 is further extended to the point 223 which connects to one side of the clock motor 125 by conductor 224, and also connects to one side of the selector drum drive motor 168. The other terminals of these motors are controlled by switches.

The conductor 216 is connected to the conductor 220 in the plug 14 and extends all the way to the other terminal of the clock motor 125, so that the clock motor runs continuously.

The contacts 218 and 219 of the plug 14 are available for a lamp, or any other utility appliance. The contacts 220 and 221, however, are the ones which are engaged by the prong contact 106, which energizes the television receiver 16 and also controls its "on" and "off" condition.

The colck motor drives the two cams 198 and 199 a quarter revolution, corresponding to a period of fifteen minutes, and at the end of each fifteen-minute period one of the switches 200*a* or 200*b* is closed.

The selector drum drive motor 168 has its other terminal connected by conductor 225 to contact 191*a* of switch 191; and the conductor 225 also extends to the contact 193 of switch unit 190.

The contact 191*b* of switch unit 191 is connected by conductor 226 to the contact 200*c* of the switch unit 200*b*. The other contact 200*d* is connected by conductor 227 to the line 216. The contact 192 of switch unit 190 is connected by conductor 228 to the contact 200*e* of the switch unit 200*a*. The other contact 200*f* is connected by conductor 229 to the line 216.

The operation of this portion of the circuit is as follows:

The clock motor 125 runs continuously and drives the cams 198 and 199. When the switch 200*a* is open the switch 200*b* is closed, but one of these switches is closed every fifteen minutes.

When the selector drum is standing still, as shown, the switch 191 is open and the switch 190 is closed. This is the condition which exists just after the switch 200*b* has been closed by the clock and the switch 191 has been closed, driving the selector drum one step, and as shown the switch 191 has just opened. Contact 200*d* next falls off step of cam 198 for quick break.

As the clock motor progresses to the next one-quarter hour position, switch 200*a* will be closed by cam 198, and as the switch 190 is already closed, this will close a circuit from line 216, conductor 229, switch 200*a*, conductor 228, switch 190, and conductor 225 through the selector drum drive motor 168, back to the line 217.

The selector drum will then be driven forward one step, amounting to fifteen minutes, and will be stopped by the opening of the circuit at the switch 190 by cam 185. Thus the clock motor and its cams energize the selector drum drive motor every fifteen minutes through the selector drum drive motor and its switches.

This drive motor controls cam 185, which may energize the drive motor at the end of any fifteen-minute period.

The structure of the Geneva pinion and gear permits a small amount of overrun so that a true step by step movement is accomplished.

The plug socket 34 has contacts 1 to 8 corresponding to the contacts on plug 35. We have already described the connection of contact 8.

Contacts 1 to 7 of each of these plugs relates to one channel each, and there are conductors 230*a*, 230*b*, 230*c*, 230*d*, 230*e*, 230*f*, and 230*g*, which are connected to the series of contacts 89*a* to 89*g*, respectively.

The switch unit 165 consists of seven separate switch assemblies, each having three blades, as shown in Fig. 9.

These conductors 230*a* to 230*g*, respectively, are connected to the lower contact spring 209*a* to 209*g*, respectively.

The uppermost contact 211 of each assembly of the unit 165 is connected by conductor 231 to the contact 220 of plug 14. When the camming lug 163 on any preselector member 158 engages the uppermost contact 211 of any switch assembly, all three contacts 211, 210 and 209 are closed.

The closure of any pair of contacts 211 and 210 energizes the television receiver through the plug contacts 220, 221. The closure of any of the two lower contacts 209 and 210 connects the line 217 through the corresponding conductor, which is one of the conductors 230*a* to 230*b*, inclusive, to the corresponding conductor 89*a* to 89*g* of the channel selector drive motor.

Thus the closure of any two of the contacts 210 and 209 energize the channel selector drive motor which is adapted to drive the rotor of the switch unit 58 until the open space 85 is located opposite the contact which relates to the channel that has been selected.

Then the circuit through the channel selector drive motor 40 is broken and this drive motor stops, leaving the television receiver tuned to that channel.

The signal lights which bear the numbers of the channel tuned are indicated at 103 in the diagram, and these lights are connected by conductor 232 to the line at 216. They are also connected by a multiplicity of conductors 233 to the conductors 230*a* to 230*g*, respectively, and when the switch contacts 210, 209 are closed the signal light corresponding to that channel is also closed.

The signal light for any selected channel remains closed throughout the fifteen-minute period because the preselector 158 for that fifteen minutes has its lug 163 in a still condition throughout the fifteen-minute period, holding the contacts 209, 210 and 211 closed.

The operation of the automatic channel selector will be apparent from the foregoing description of its parts, but will be summarized as follows:

The selector drum or cage supports a preselector plunger for each fifteen minutes, having a lug which is adapted to close one of seven switches, depending on which channel of seven is selected.

The clock motor runs continuously but is not strong enough to drive the selector cage. The clock motor drives the cams which are arranged to actuate two switches, one of which is closed every fifteen minutes.

When one of these switches is closed by the clock motor the circuit is completed to the selector drive motor 168, which drives the selector with a step by step motion, moving it through an angle corresponding to fifteen minutes and then holding it still.

The selector drive motor is energized through one of two switches which are controlled by a cam driven by the selector drive motor. As soon as the selector drive motor has moved the selector one step, this cam opens the switch in the selector drive motor circuit and stops the motor but closes another switch preparatory to the next step.

Thus the selector moves step by step and it carries with it the multiplicity of preselector plungers, each of which is adjusted in or out to call for a certain station.

As the selector moves forward one step one of these preselectors actuates the selector switch assembly 165 for one channel. This closes the circuit through the television receiver to energize it, and also closes a circuit through the channel selector drive motor which rotates the shaft of the television tuner or channel selector.

The channel selector of the television receiver is then rotated until it reaches the channel selected, whereupon the channel selector drive motor is deenergized by its controlling switch mechanism, leaving the television receiver tuned to the channel selected and indicating the state of affairs by a signal light bearing that number.

Thus the present automatic television channel selector is adapted to condition the television receiver so that any channel which has been selected for any fifteen-minute period will be automatically turned "on" and tuned.

The volume of the voice and other adjustments made with other dials on the television receiver may still be adjusted at any time.

Figure 12:
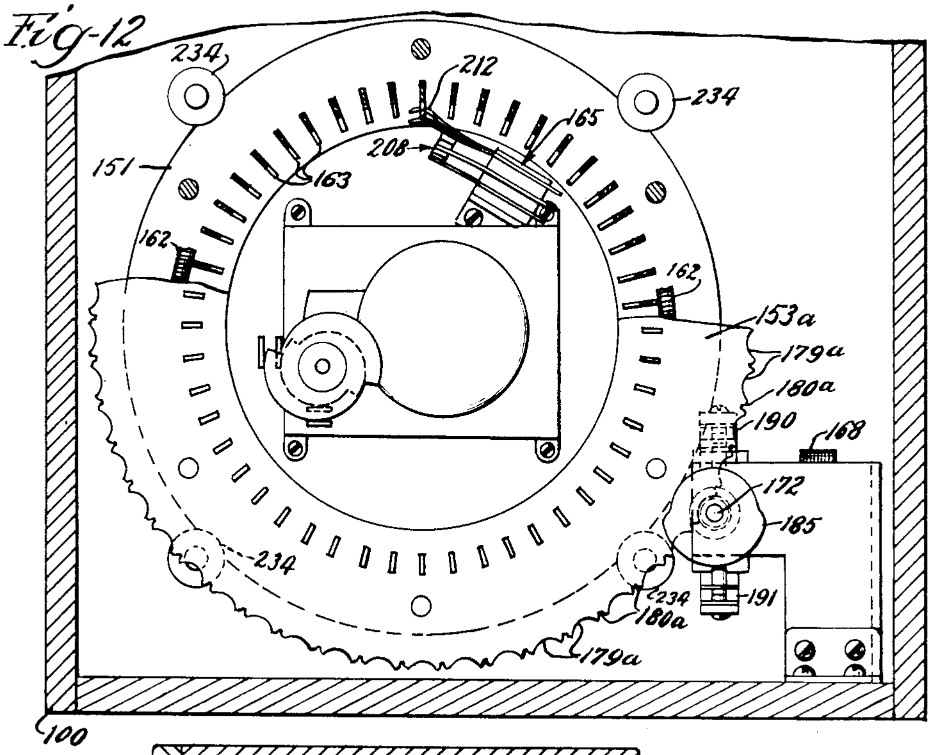
Fig. 12 is a view similar to Fig. 9 of a modification.
Figure 13:
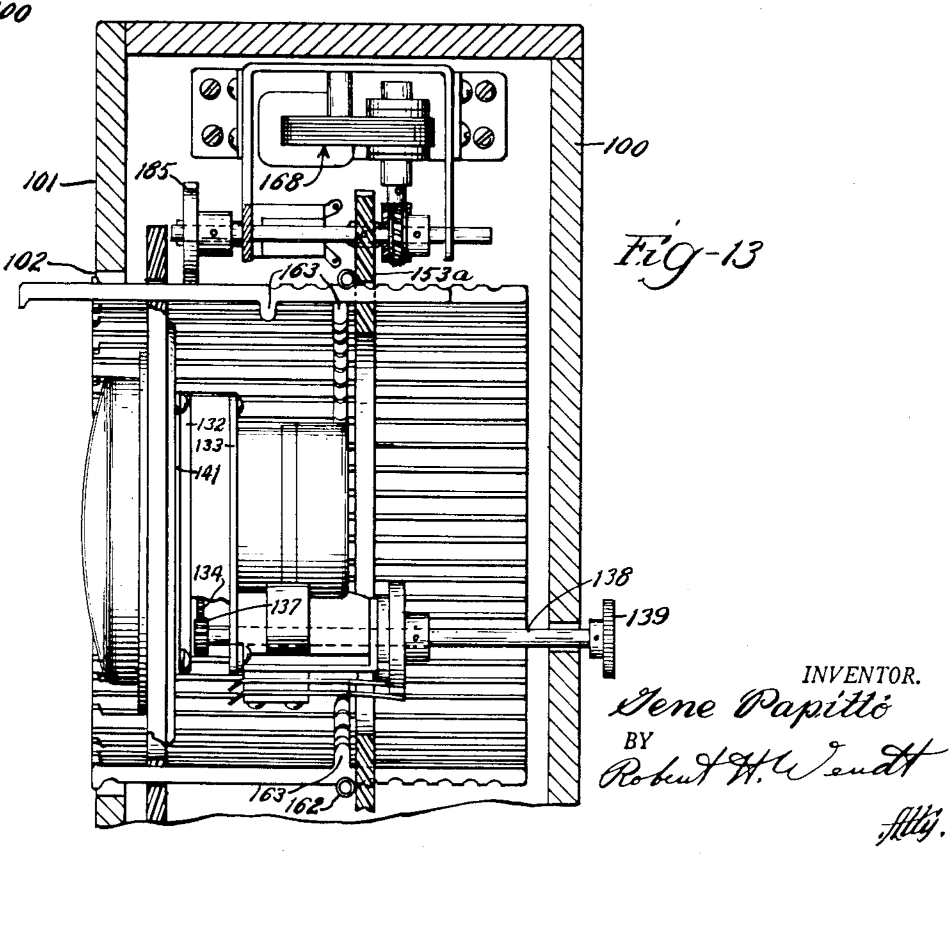
Fig. 13 is a view similar to Fig. 7 of this modification.

Referring to Figs. 12 and 13, these are views of a modification in which the Geneva gear indicated by the numeral 153*a* has its round grooves 179*a* and tooth grooves 180*a* on the outside or periphery of the disc.

Figure 8:
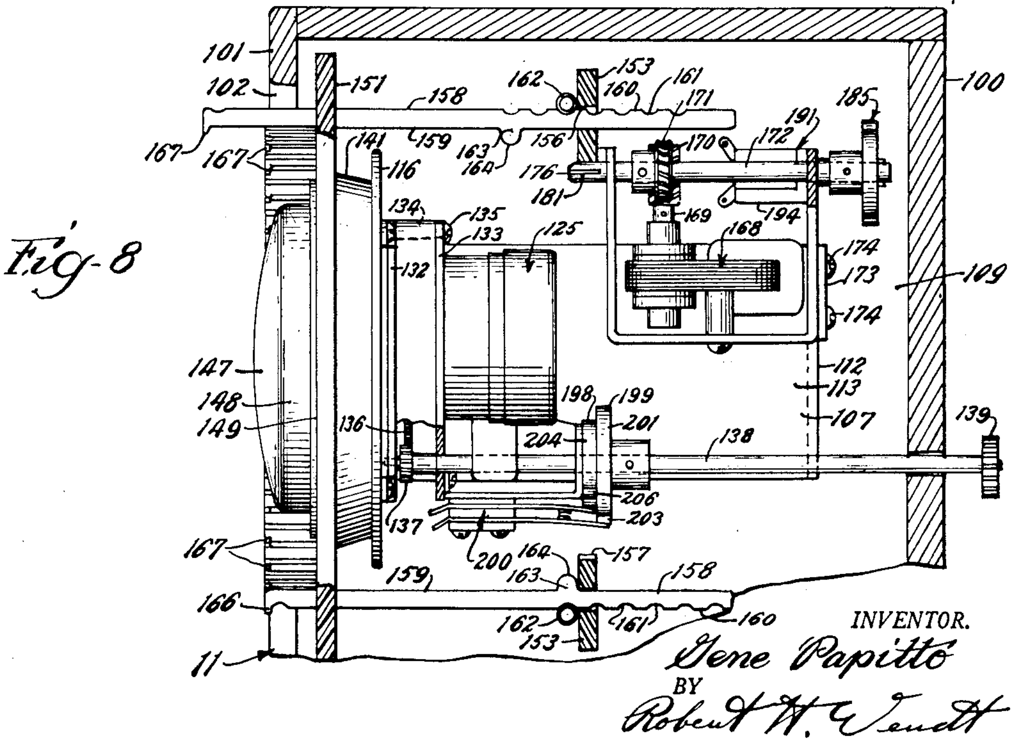
Fig. 8 is another similar view taken on the plane of the line 8—8 of Fig. 9.

The device is made much more compact by arranging the channel selector drive motor 168 beside the other mechanism instead of placing it behind the mechanism, as shown in Fig. 8. All of the other parts of the mechanism are substantially the same.

In each case rollers 234 are preferably employed for engaging and supporting the selector disc 141 by engaging its periphery.

It will thus be observed that I have invented an improved automatic channel selector for television receivers which may be so adjusted that the observer's favorite stations are preselected for certain times, and the entire program for twenty-four hours may be selected on this device.

Thereafter the present automatic selector will select the same or another station every fifteen minutes of the day or night, and this will be done without any further attention on the part of the user.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an automatic channel selector for television receivers, the combination of a television receiver having a channel selector shaft provided with an indexer to stop the shaft at any one of a plurality of channels, a drive motor unit operatively connected to said shaft, and having sufficient power to drive the shaft against the indexer, a switching mechanism controlled by the drive motor shaft, and having a rotor provided with a continuous contact extending adjacent its periphery, with one portion cut away at the channel selected so that the rotor stops when it reaches the position of the channel selected, and an automatic switching mechanism having a pre-selector member which may be adjusted for any one of a plurality of channels, and having a switch for each channel, the said pre-selector moving relative to said switches and closing the switch for which it is adjusted, thereby automatically energizing the motor, driving the channel selector shaft, which is rotated to the selected channel.

2. In an automatic channel selector for television receivers, the combination of a television receiver having a channel selector shaft provided with an indexer to stop the shaft at any one of a plurality of channels, a drive motor unit operatively connected to said shaft, and having sufficient power to drive the shaft against the indexer, a switching mechanism controlled by the drive motor shaft, and having a rotor provided with a continuous contact extending adjacent its periphery, with one portion cut away at the channel selected so that the rotor stops when it reaches the position of the channel selected, and an automatic switching mechanism having a pre-selector member which may be adjusted for any one of a plurality of channels, and having a switch for each channel, the said pre-selector moving relative to said switches and closing the switch for which it is adjusted, thereby automatically energizing the motor, driving the channel selector shaft, which is rotated to the selected channel, said pre-selector being one of a multiplicity of pre-selectors arranged in a circle, and step by step means for moving all of the pre-selectors to cause the pre-selectors one after another to energize the proper switch to tune the television in the proper channel.

3. In an automatic channel selector for television receivers, the combination of a television receiver having a channel selector shaft provided with an indexer to stop the shaft at any one of a plurality of channels, a drive motor unit operatively connected to said shaft, and having sufficient power to drive the shaft against the indexer, a switching mechanism controlled by the drive motor shaft, and having a rotor provided with a continuous contact extending adjacent its periphery, with one portion cut away at the channel selected so that the rotor stops when it reaches the position of the channel selected, and an automatic switching mechanism having a pre-selector member which may be adjusted for any one of a plurality of channels, and having a switch for each channel, the said pre-selector moving relative to said switches and closing the switch for which it is adjusted, thereby automatically energizing the motor, driving the channel selector shaft, which is rotated to the selected channel, said pre-selector being one of a multiplicity of pre-selectors arranged in a circle, and step by step means for moving all of the pre-selectors to cause the pre-selectors one after another to energize the proper switch to tune the television in the proper channel, the said pre-selectors being movably mounted upon a pair of insulating circular members rotatably mounted upon a stable support.

4. In an automatic channel selector for television receivers, the combination of a television receiver having a channel selector shaft provided with an indexer to stop the shaft at any one of a plurality of channels, a drive motor unit operatively connected to said shaft, and having sufficient power to drive the shaft against the indexer, a switching mechanism controlled by the drive motor shaft, and having a rotor provided with a continuous contact extending adjacent its periphery, with one portion cut away at the channel selected so that the rotor stops when it reaches the position of the channel selected, and an automatic switching mechanism having a pre-selector member which may be adjusted for any one of a plurality of channels, and having a switch for each channel, the said pre-selector moving relative to said switches and closing the switch for which it is adjusted, thereby automatically energizing the motor, driving the channel selector shaft, which is rotated to the selected channel, said preselector being one of a multiplicity of pre-selectors arranged in a circle, and step by step means for moving all of the pre-selectors to cause the pre-selectors one after another to energize the proper switch to tune the television in the proper channel, the said pre-selectors being movably mounted upon a pair of insulating circular members rotatably mounted upon a stable support, and said circular members being driven by a selector drive motor.

5. In an automatic channel selector for television receivers, the combination of a television receiver having a channel selector shaft provided with an indexer to stop the shaft at any one of a plurality of channels, a drive motor unit operatively connected to said shaft, and having sufficient power to drive the shaft against the indexer, a switching mechanism controlled by the drive motor shaft, and having a rotor provided with a continuous contact extending adjacent its periphery, with one portion cut away at the channel selected so that the rotor stops when it reaches the position of the channel selected, and an automatic switching mechanism having a pre-selector member which may be adjusted for any one of a plurality of channels, and having a switch for each channel, the said pre-selector moving relative to said switches and closing the switch for which it is adjusted, thereby automatically energizing the motor, driving the channel selector shaft, which is rotated to the selected channel, said pre-selector being one of a multiplicity of pre-selectors arranged in a circle, and step by step means for moving all of the pre-selectors to cause the pre-selectors one after another to energize the proper switch to tune the television in the proper channel, the said pre-selectors being movably mounted upon a pair of insulating circular members rotatably mounted upon a stable support, and said circular members being driven by a selector drive motor, and an electrical synchronous clock motor for indicating the time and controlling the energization of said selector drive motor at the end of any one of a plurality of successive periods of time.

6. In a controlling mechanism for an automatic channel selector for television receivers, the combination of an electric synchronous clock motor, said clock motor having an extending shaft provided with a cam, having a pair of peripheral surfaces of gradually increasing radius, and a pair of abrupt drops, two electric switches arranged to be actuated by said cam to close the circuits in which the switches are included alternately, a channel selector drive motor having operative connection for driving a pre-selector rotor step by step, said selector drive motor also driving a cam having a pair of rises, and having a pair of switches alternately opened and closed, the clock motor switches closing the circuit to the selector drive motor, and the drive motor switches opening the circuit to reduce over-drive to a minimum.

7. In an automatic channel selector, the combination of a support having a metal bracket secured thereto and having a forwardly extending flange, a synchronous clock mechanism carried by said forwardly extending flange, a channel pre-selector rotor rotatably mounted and exposed outside of the periphery of said clock mechanism, said rotor comprising a pair of insulating members joined together by tie rods and spacers and rotatably mounted on said support, and a multiplicity of channel pre-selectors slidably mounted in apertures arranged in a circle in said insulating members, said channel pre-selectors having a plurality of partially circular grooves on one side, and said pre-selector members being arranged in a circle, a continuous helical coil spring extending about all of said channel pre-selectors and tensioned to be drawn into a groove in each channel pre-selector, the spring acting as an indexer and being held in fixed position by all the pre-selectors which are not being moved when any one or more pre-selectors is being adjusted.

8. In an automatic channel selector, the combination of a support having a metal bracket secured thereto and having a forwardly extending flange, a synchronous clock mechanism carried by said forwardly extending flange, a channel pre-selector rotor rotatably mounted and exposed outside of the periphery of said clock mechanism, said rotor comprising a pair of insulating members joined together by tie rods and spacers and rotatably mounted on said support, and a multiplicity of channel pre-selectors slidably mounted in apertures arranged in a circle in said insulating members, said channel pre-selectors having a plurality of partially circular grooves on one side, and said pre-selector members being arranged in a circle, a continuous helical coil spring extending about all of said channel pre-selectors and tensioned to be drawn into a groove in each channel pre-selector, the spring acting as an indexer and being held in fixed position by all the pre-selectors which are not being moved when any one or more pre-selectors is being adjusted, the said support having a switch band including a plurality of resilient blades for each channel, and said pre-selectors having a projecting lug engaging one of the blades of one of the switches of said bank, corresponding to the channel which has been selected by adjusting the pre-selector.

9. In an automatic channel selector, the combination of a support having a metal bracket secured thereto and having a forwardly extending flange, a synchronous clock mechanism carried by said forwardly extending flange, a channel pre-selector rotor rotatably mounted and exposed outside of the periphery of said clock mechanism, said rotor comprising a pair of insulating members joined together by tie rods and spacers and rotatably mounted on said support, and a multiplicity of channel pre-selectors slidably mounted in apertures arranged in a circle in said insulating members, said channel pre-selectors having a plurality of partially circular grooves on one side, and said pre-selector members being arranged in a circle, a continuous helical coil spring extending about all of said channel pre-selectors and tensioned to be drawn into a groove in each channel pre-selector, the spring acting as an indexer and being held in fixed position by all the pre-selectors which are not being moved when any one or more pre-selectors is being adjusted, the said support having a switch bank including a plurality of resilient blades for each channel, and said pre-selectors having a projecting lug engaging one of the blades of one of the switches of said bank, corresponding to the channel which has been selected by adjusting the pre-selector, said support having a signal light behind a screen bearing the channel number for each channel and connected in circuit with contacts for each channel, so that the energization of the signal light indicates the channel for which the circuit has just been closed.

10. In an automatic channel selector, the combination of a support having a metal bracket secured thereto and having a forwardly extending flange, a synchronous clock mechanism carried by said forwardly extending flange, a channel pre-selector rotor rotatably mounted and exposed outside of the periphery of said clock mechanism, said rotor comprising a pair of insulating members joined together by tie rods and spacers and rotatably mounted on said support, and a multiplicity of channel pre-selectors slidably mounted in apertures arranged in a circle in said insulating members, said channel pre-selectors having a plurality of partially circular grooves on one side, and said pre-selector members being arranged in a circle, a continuous helical coil spring extending about all of said channel pre-selectors and tensioned to be drawn into a groove in each channel pre-selector, the spring acting as an indexer and being held in fixed position by all the pre-selectors which are not being moved when any one or more pre-selectors is being adjusted, the said support having a switch bank including a plurality of resilient blades for each channel, and said pre-selectors having a projecting lug engaging one of the blades of one of the switches of said bank, corresponding to the channel which has been selected by adjusting the pre-selector, said support having a signal light behind a screen bearing the channel number for each channel and connected in circuit with contacts for each channel, so that the energization of the signal light indicates the channel for which the circuit has just been closed, the said pre-selectors having their actuating ends, surrounding the clock, turned alternately inward or outward for more convenient engagement with the fingers to actuate the pre-selector.

11. In an automatic channel selector, the combination of a support having a metal bracket secured thereto and having a forwardly extending flange, a synchronous clock mechanism carried by said forwardly extending flange, a channel pre-selector rotor rotatably mounted and exposed outside of the periphery of said clock mechanism, said rotor comprising a pair of insulating members joined together by tie rods and spacers and rotatably mounted on said support, and a multiplicity of channel pre-selectors slidably mounted in apertures arranged in a circle in said insulating members, said channel pre-selectors having a plurality of partially circular grooves on one side, and said pre-selector members being arranged in a circle, a continuous helical coil spring extending about all of said channel pre-selectors and tensioned to be drawn into a groove in each channel pre-selector, the spring acting as an indexer and being held in fixed position by all the pre-selectors which are not being moved when any one or more pre-selectors is being adjusted, the said support having a switch bank including a plurality of resilient blades for each channel, and said pre-selectors having a projecting lug engaging one of the blades of one of the switches of said bank, corresponding to the channel which has been selected by adjusting the pre-selector, said support having a signal light behind a screen bearing the channel number for each channel and connected in circuit with contacts for each channel, so that the energization of the signal light indicates the channel for which the circuit has just been closed, said rotor having a circular edge portion formed with alternate tooth grooves and concave cylindrical sliding surfaces, forming a Geneva gear, and a driving pinion having a pair of diametrically opposite teeth and complementary concave surfaces for engaging in the circular grooves and driving the rotor step by step.

12. In an automatic channel selector, the combination of a support having a metal bracket secured thereto and having a forwardly extending flange, a synchronous clock mechanism carried by said forwardly extending flange, a channel pre-selector rotor rotatably mounted and exposed outside of the periphery of said clock mechanism, said rotor comprising a pair of insulating members joined together by tie rods and spacers and rotatably mounted on said support, and a multiplicity of channel pre-selectors slidably mounted in apertures arranged in a circle in said insulating members, said channel pre-selectors having a plurality of partially circular grooves on one side, and said pre-selector members being arranged in a circle, a continuous helical coil spring extending about all of said channel pre-selectors and tensioned to be drawn into a groove in each channel pre-selector, the spring acting as an indexer and being held in fixed position by all the pre-selectors which are not being moved when any one or more pre-selectors is being adjusted, the said support having a switch bank including a plurality of resilient blades for each channel, and said pre-selectors having a projecting lug engaging one of the blades of one of the switches of said bank, corresponding to the channel which has been selected by adjusting the pre-selector, said support having a signal light behind a screen bearing the channel number for each channel and connected in circuit with contacts for each channel, so that the energization of the signal light indicates the channel for which the circuit has just been closed, said rotor having a circular edge portion formed with alternate tooth grooves and concave cylindrical sliding surfaces, forming a Geneva gear, and a driving pinion having a pair of diametrically opposite teeth and complementary concave surfaces for engaging in the circular grooves and driving the rotor step by step, a synchronous electric clock motor, having switching means for controlling the step by step movement, and an electric drive motor driving said Geneva pinion and energized by the clock controlled switch means.

13. In an automatic channel selector, the combination of a support having a metal bracket secured thereto and having a forwardly extending flange, a synchronous clock mechanism carried by said forwardly extending flange, a channel pre-selector rotor rotatably mounted and exposed outside of the periphery of said clock mechanism, said rotor comprising a pair of insulating members joined together by tie rods and spacers and rotatably mounted on said support, and a multiplicity of channel pre-selectors slidably mounted in apertures arranged in a circle in said insulating members, said channel pre-selectors having a plurality of partially circular grooves on one side, and said pre-selector members being arranged in a circle, a continuous helical coil spring extending about all of said channel pre-selectors and tensioned to be drawn into a groove in each channel pre-selector, the spring acting as an indexer and being held in fixed position by all the pre-selectors which are not being moved when any one or more pre-selectors is being adjusted, the said support having a switch bank including a plurality of resilient blades for each channel, and said pre-selectors having a projecting lug engaging one of the blades of one of the switches of said bank, corresponding to the channel which has been selected by adjusting the pre-selector, said support having a signal light behind a screen bearing the channel number for each channel and connected in circuit with contacts for each channel, so that the energization of the signal light indicates the channel for which the circuit has just been closed, said rotor having a circular edge portion formed with alternate tooth grooves and concave cylindrical sliding surfaces, forming a Geneva gear, and a driving pinion having a pair of diametrically opposite teeth and complementary concave surfaces for engaging in the circular grooves and driving the rotor step by step, a synchronous electric clock motor, having switching means for controlling the step by step movement, and an electric drive motor driving said Geneva pinion and energized by the clock controlled switch means, the said drive motor also controlling a switching means located in the circuit of the drive motor and adapted to break the circuit at the end of a predetermined rotation of the drive motor equivalent to one step of the rotor.

14. In an automatic channel selector for a television receiver, the combination of electric motor means for driving the channel selector shaft of the receiver against the resistance of the indexer on said shaft, switch means for each channel connected to energize said motor, switch means driven by said motor and having one open circuit, which corresponds to the channel selected, the motor stopping at said open circuit, a channel pre-selector movably mounted on a support, and clock means for controlling its movement step by step, each step of movement occurring at the end of a fifteen minute period.

15. In an automatic channel selector for a television receiver, the combination of electric motor means for driving the channel selector shaft of the receiver against the resistance of the indexer on said shaft, switch means for each channel connected to energize said motor, switch means driven by said motor and having one open circuit, which corresponds to the channel selected, the motor stopping at said open circuit, a channel pre-selector movably mounted on a support, and clock means for controlling its movement step by step, each step of movement occurring at the end of a fifteen minute period, electric switch means controlled by said clock and adapted to energize a drive motor for moving the pre-selector step by step.

16. In an automatic channel selector for a television receiver, the combination of electric motor means for driving the channel selector shaft of the receiver against the resistance of the indexer on said shaft, switch means for each channel connected to energize said motor, switch means driven by said motor and having one open circuit, which corresponds to the channel selected, the motor stopping at said open circuit, a channel pre-selector movably mounted on a support, and clock means for controlling its movement step by step, each step of movement occurring at the end of a fifteen minute period, electric switch means controlled by said clock and adapted to energize a drive motor for moving the pre-selector step by step, and switch means controlled by the drive motor of the pre-selector for breaking the circuit of said latter drive motor after it has rotated sufficiently to produce one step of movement of the pre-selector.

17. In an automatic channel selector for a television receiver, the combination of electric motor means for driving the channel selector shaft of the receiver against the resistance of the indexer on said shaft, switch means for each channel connected to energize said motor, switch means driven by said motor and having one open circuit, which corresponds to the channel selected, the motor stopping at said open circuit, a channel pre-selector movably mounted on a support, and clock means for controlling its movement step by step, each step of movement occurring at the end of a fifteen minute period, electric switch means controlled by said clock and adapted to energize a drive motor for moving the pre-selector step by step, and switch means controlled by the drive motor of the pre-selector for breaking the circuit of said latter drive motor after it has rotated sufficiently to produce one step of movement of the pre-selector, and a signal light for each channel adapted to be energized by the first-mentioned switch means to indicate the channel to which the mechanism has just been moved.

18. In an automatic channel selector for television receivers, the combination of motor means for driving the channel selector shaft of the receiver and stopping at a predetermined channel, synchronous electric clock means for indicating the passage of time and periodically energizing a switch means controlling the selector, a channel selector cage having a pre-selector for each fifteen minutes, adapted to actuate a selected switch, a bank of switches, one of which is actuated by each pre-selector, a motor for driving said pre-selector cage step by step at the end of each fifteen minute period, the said motor being controlled by said clock, and said bank of switches being connected to control the energization of a channel selector shaft motor, and switch means driven by said latter motor for opening the energizing circuit when the channel selector shaft has arrived at the position of the channel selected.

19. In an automatic channel selector for television receivers, the combination of motor means for driving the channel selector shaft of the receiver and stopping at a predetermined channel, synchronous electric clock means for indicating the passage of time and periodically energizing a switch means controlling the selector, a channel selector cage having a pre-selector for each fifteen minutes, adapted to actuate a selected switch, a bank of switches, one of which is actuated by each pre-selector, a motor for driving said pre-selector cage step by step at the end of each fifteen minute period, the said motor being controlled by said clock, and said bank of switches being connected to control the energization of a channel selector shaft motor, and switch means driven by said latter motor for opening the energizing circuit when the channel selector shaft has arrived at the position of the channel selected, and illuminated signal means for indicating the number of the channel to which the channel selector shaft has been turned.

References Cited in the file of this patent

UNITED STATES PATENTS

| | | |
|---|---|---|
| 2,190,832 | Elliott | Feb. 20, 1940 |
| 2,403,161 | Yardeny | July 2, 1946 |
| 2,545,055 | Switzer | Mar. 13, 1951 |
| 2,563,250 | Lacks | Aug. 7, 1951 |
| 2,620,432 | Tolson | Dec. 2, 1952 |